(12) United States Patent
Gutman

(10) Patent No.: US 6,449,355 B1
(45) Date of Patent: Sep. 10, 2002

(54) METHOD AND SYSTEM FOR PROVIDING ASSISTANCE TO USERS OF A SERVICE

(75) Inventor: Abraham Gutman, Miami Beach, FL (US)

(73) Assignees: MediaOne Group, Inc., Englewood, CO (US); US West, Inc., Denver, CO (US)

( * ) Notice: Subject to any disclaimer, the term of this patent is extended or adjusted under 35 U.S.C. 154(b) by 0 days.

(21) Appl. No.: 08/994,057

(22) Filed: Dec. 19, 1997

(51) Int. Cl.[7] ........................ H04M 11/00; H04M 3/00
(52) U.S. Cl. ..................... 379/265.01; 379/88.18; 379/100.08; 709/277
(58) Field of Search ................. 379/265, 266, 379/267, 67.1, 69, 68, 309, 112, 88.13, 88.12, 100.08, 100.06; 707/4, 10; 709/202, 204; 705/44, 235; 704/260, 275

(56) References Cited

U.S. PATENT DOCUMENTS

| | | | | |
|---|---|---|---|---|
| 5,097,528 A | * | 3/1992 | Gursahaney et al. | 379/67.1 |
| 5,402,474 A | * | 3/1995 | Miller et al. | 379/267 |
| 5,446,883 A | * | 8/1995 | Kirkbride et al. | 709/202 |
| 5,533,103 A | * | 7/1996 | Peavey et al. | 379/69 |
| 5,594,791 A | * | 1/1997 | Szlam et al. | 379/265 |
| 5,909,679 A | * | 6/1999 | Hall | 704/4 |
| 6,005,928 A | * | 12/1999 | Johnson | 379/112 |
| 6,026,148 A | * | 2/2000 | Dworkin et al. | 379/265 |
| 6,064,990 A | * | 5/2000 | Goldsmith | 340/825.34 |
| 6,088,683 A | * | 7/2000 | Jalili | 379/93.23 |
| 6,138,907 A | * | 10/2000 | Mori et al. | 235/379 |
| 6,149,056 A | * | 11/2000 | Stinson et al. | 235/379 |
| 6,234,964 B1 | * | 5/2001 | Hiff | 600/300 |

* cited by examiner

*Primary Examiner*—Curtis Kuntz
*Assistant Examiner*—Rexford N Barnie
(74) *Attorney, Agent, or Firm*—Brooks & Kushman P.C.

(57) ABSTRACT

A method and system are provided for assisting users of a given service. When a request for assistance from a user is received by a service employee, an interaction is initiated between the user and the service employee. A transcript of the interaction is generated during the interaction, and the transcript is transmitted to the user at the end of the interaction. The interaction between the user and the service employee may take place via telephone or electronic mail, and the transcript may be transmitted to either an electronic or physical address associated with the user. The transcript provides a reference for problem resolution, so that the user should not need to request assistance for the same problem in the future.

6 Claims, 2 Drawing Sheets

METHOD AND SYSTEM FOR PROVIDING ASSISTANCE TO USERS OF A SERVICE

TECHNICAL FIELD

This invention relates to a method and system for providing assistance to users of a given service, and in particular to a method and system whereby a transcript of a session between a user and a service employee is generated and sent to the user to serve as a reference for the future.

BACKGROUND ART

Most services provide a telephone hotline accessible to users of that service should they need assistance. Typically, a service employee, such as a customer service representative, answers the calls and provides assistance to users over the telephone. The problem-solving method followed by the service employee usually involves a series of questions regarding the nature of the problem and the corresponding steps to follow in order to diagnose and then resolve the problem. In many cases, the solution method is quite lengthy, and most users simply follow the steps given by the service employee without making notes of the process or attempting to understand the technical nature of the problem.

As a result of the length and technical difficulty of many problem solutions, many users must contact the service for assistance with problems for which they have called previously. Contacting the service regarding these repeat problems is time-consuming for the user, as well as costly for the service in terms of time and resources. Therefore, a need exists for a more efficient method of assisting users of a particular service, such that users have a reference for problem resolution in the future.

DISCLOSURE OF THE INVENTION

It is an object of the present invention to provide a more efficient method of providing assistance to a user of a given service.

It is a further object of the present invention to provide increased assistance to a user by generating a transcript of the interaction between the user and the service employee and sending the transcript to the user.

It is a still further object of the present invention to help educate users on the technical aspects of the service to which they have subscribed.

Accordingly, a method is provided for assisting users of a given service. When a signal from a user is received by a service employee, the user and the service employee initiate an interaction. Next, a transcript is generated based on the interaction between the user and the service employee. The interaction is monitored such that an end of the interaction is detected. At the end of the interaction, the transcript is transmitted to the user to serve as a reference for future problem resolution.

In one embodiment, the user contacts the service employee via the telephone, and verbal interaction between the user and the service employee is supplemented by a written transcript of the interaction which is sent to either an electronic or physical address associated with the user. Alternatively, the user and the service employee may interact electronically via real-time chat. Preferably, the transcript is generated automatically from the path chosen by the service employee through question/answer pairs contained in a knowledge base.

The above objects and other objects, features and advantages of the present invention are more readily understood from a review of the attached drawings and the accompanying specification and claims.

BEST MODE FOR CARRYING OUT THE INVENTION

Figure 1:
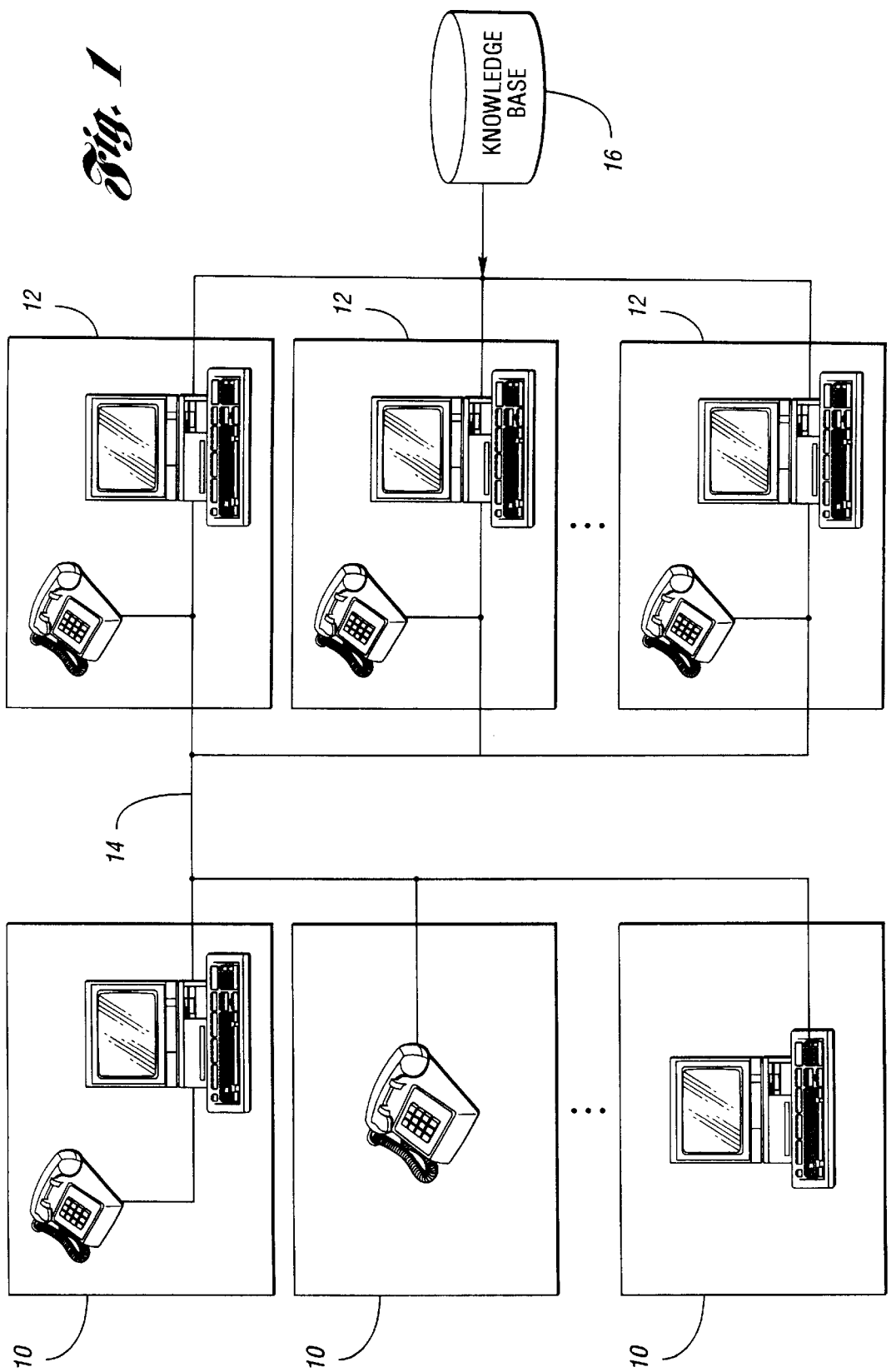
FIG. 1 is a schematic diagram illustrating the components of the system of the present invention.

Referring first to FIG. 1, illustrated is a system for providing assistance to a user of a service in accordance with the present invention. The type of service is generally, but not limited to, a telecommunications-related service, such as cable, telephone, cable-modem, or Internet. The system comprises a user station 10 and a service station 12, each of which are linked to a communications network 14. Through user station 10 and service station 12, the user and service employee, respectively, conduct an interaction based on a request for assistance by the user. In the preferred embodiment, service station 12 includes a knowledge base 16 containing question and answer choices for the service employee to follow during the interaction with the user.

Figure 2:
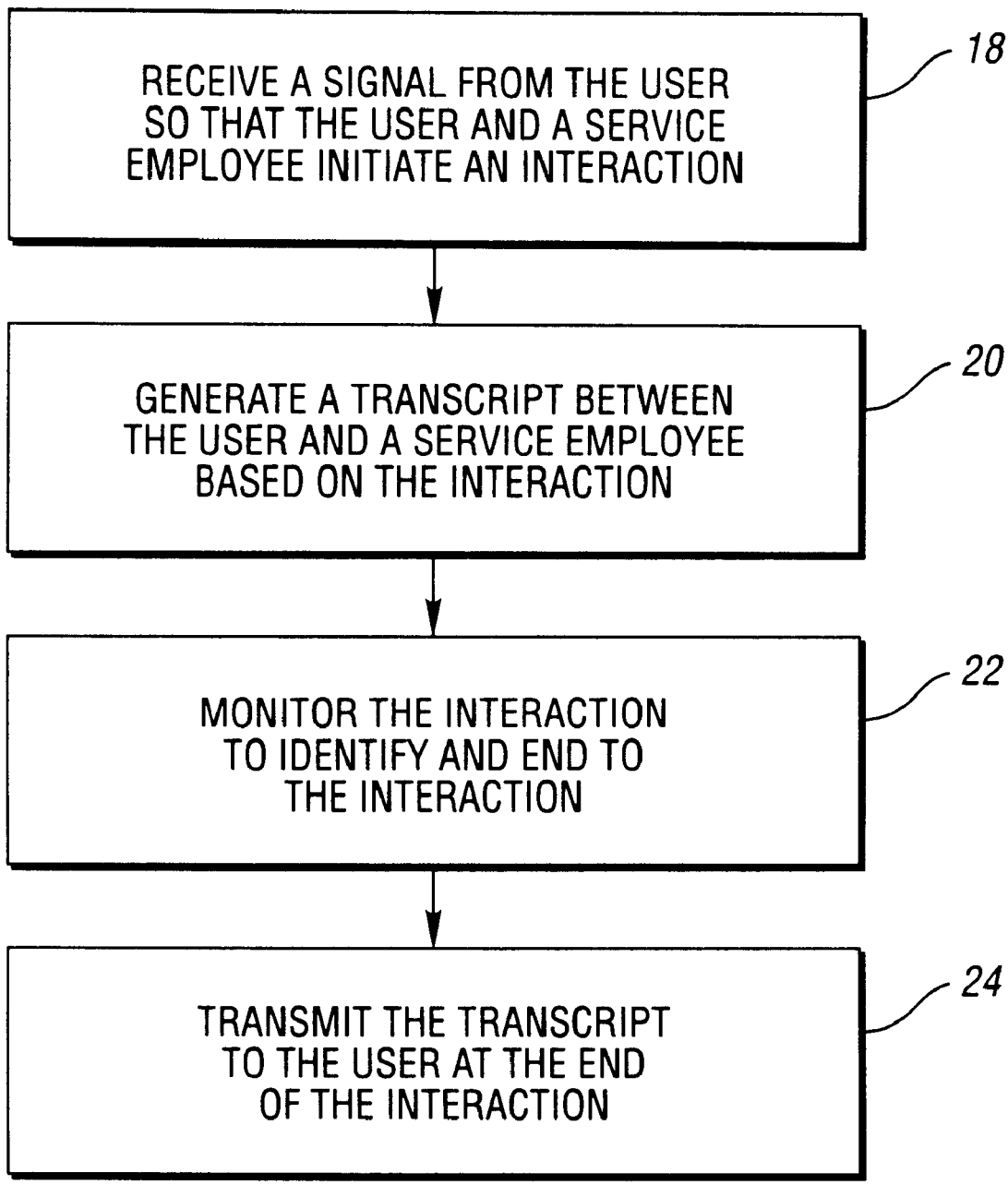
FIG. 2 is a flow chart illustrating the general steps of the method of user assistance of the present invention.

Referring now to FIG. 2, the method of providing assistance to a user of a service is outlined. First, as denoted by block 18, a signal from a user is received by a service employee, such as a customer service representative, so as to initiate an interaction between the user and the service employee. In the preferred embodiment, user station 10 and service station 12 each comprise a telephone and an intelligent terminal, such as a computer having a modem and electronic mail capabilities. With this configuration, interaction between the user and the service employee occurs verbally via the telephone, for example, through a call from the user to a telephone hotline. Alternatively, the user could utilize the intelligent terminal to establish an electronic connection with service station 12 and conduct an interaction with the service employee via real-time chat.

Next, at block 20, a transcript of the interaction between the user and the service employee is generated. In an embodiment where service station 12 comprises only a telephone, the interaction must be transcribed manually by the service employee. Preferably, using an intelligent terminal, the transcript is generated automatically during the interaction through use of information stored in knowledge base 16. In the preferred embodiment, the service employee chooses a path through question/answer pairs contained in knowledge base 16 based on interaction with the user regarding the nature of the problem. The transcript of the interaction is then generated automatically from the steps in the path chosen through knowledge base 16. At times, the appropriate question or answer may not be present in knowledge base 16, such that the service employee must improvise when trying to solve the problem. In such a case, the information provided by the service employee will also become part of the transcript and then be entered into knowledge base 16 to improve future problem assistance.

Still referring to FIG. 2, the. interaction is monitored, as denoted by block 22, to identify an end to the interaction. The end of the interaction may be identified as a termination of the telephone call or the electronic connection to service station 12. At the end of the interaction, shown at block 24, the transcript is transmitted to the user to serve as a reference for problem resolution in the future. In the preferred embodiment, user station 10 and service station 12 each include an intelligent terminal, and the transcript is sent to the user in the form of an electronic mail message. Alternatively, the transcript may be sent to a physical address associated with the user.

By sending a transcript of the problem resolution to the user, the user will hopefully not need to spend time contacting the service again for assistance with the same problem. Thus, service employees will be freed to answer questions from other users, and the efficiency and quality of assistance will be improved. In addition, this method of assistance encourages users to become more educated about the service to which they have subscribed.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. In a system having a user station and a service station, the user station including a telephone and the service station including a telephone and an intelligent terminal, a method for providing a user of a telecommunications service at the user station with a transcript of an interaction between the user and a service employee at the service station, the method comprising:

receiving a request for problem assistance regarding the telecommunications service from the user via the telephone so that an interaction between the user and the service employee is initiated;

guiding the interaction between the user and the service employee using question/answer pairs contained in a knowledge base of the intelligent terminal;

determining if all question/answer pairs necessary for the interaction are contained in the knowledge base;

if not, entering additional question/answer pairs into the knowledge base to improve future problem assistance;

generating a transcript of the interaction automatically using the intelligent terminal;

identifying an end to the interaction; and transmitting the transcript to the user at the end of the interaction via an electronic mail to serve as a reference for future problem resolution.

2. The method of claim 1 wherein receiving the request for assistance from the user further includes receiving a request via the intelligent terminal.

3. The method of claim 1 wherein transmitting the transcript includes transmitting the transcript to the user at a physical address.

4. A system for providing a user of a telecommunications service with a transcript of an interaction between the user and a service employee, the system comprising:

a user station linked to a communications network for allowing the user to interact with the service employee, the user station including a telephone; and a service station linked to the communications network and including a telephone and an intelligent terminal, wherein the service station allows the service employee to receive a request for problem assistance regarding the telecommunications service from the user via the telephone so that an interaction between the user and the service employee is initiated, guides the interaction between the user and the service employee using question/answer pairs contained in a knowledge base of the intelligent terminal, allows the service employee to determine if all question/answer pairs necessary for the interaction are contained in the knowledge base, allows the service employee to enter additional question/answer pairs into the knowledge base to improve future problem assistance, automatically generates a transcript of the interaction, identifies an end to the interaction, and transmits the transcript to the user at the end of the interaction via an electronic mail to serve as a reference for future problem resolution.

5. The system of claim 3 wherein the user station includes an intelligent terminal.

6. The system of claim 3 wherein the service station transmits the transcript to a physical address associated with the user.

* * * * *